(12) United States Patent  
Leeman et al.

(10) Patent No.: US 7,149,403 B2  
(45) Date of Patent: Dec. 12, 2006

(54) OPTICAL FIBRE SEALING ASSEMBLY

(75) Inventors: Sam Leeman, Leuven (BE); Jan Watte, Grimbergen (BE); Walter Mattheus, Kessel-Lo (BE); Peter Van Overmeir, Munich (DE)

(73) Assignee: Tyco Electronics Raychem N.V. (BE)

( * ) Notice: Subject to any disclaimer, the term of this patent is extended or adjusted under 35 U.S.C. 154(b) by 0 days.

(21) Appl. No.: 11/377,147

(22) Filed: Mar. 16, 2006

(65) Prior Publication Data

US 2006/0182408 A1 Aug. 17, 2006

Related U.S. Application Data

(63) Continuation of application No. 11/227,581, filed on Sep. 15, 2005, now Pat. No. 7,046,901, which is a continuation of application No. 10/475,768, filed as application No. PCT/GB02/01745 on Apr. 15, 2002, now Pat. No. 6,968,113.

(30) Foreign Application Priority Data

Apr. 27, 2001 (GB) ................................ 0110366.2

(51) Int. Cl.  
*G02B 6/00* (2006.01)

(52) U.S. Cl. ..................................... 385/138

(58) Field of Classification Search ......... 385/134–138  
See application file for complete search history.

(56) References Cited

U.S. PATENT DOCUMENTS 3,236,015 A 2/1966 Rubenstein ................ 52/309.3
4,135,587 A 1/1979 Diaz ........................... 174/92
4,954,670 A 9/1990 Jensen et al. ................. 174/92
5,416,873 A 5/1995 Huebscher et al. ........... 385/99
5,568,584 A 10/1996 Smith ........................ 385/135

FOREIGN PATENT DOCUMENTS

| DE | 78 16 729 | 9/1978 |
|---|---|---|
| EP | 0635193 | 1/1995 |
| GB | 2153105 | 8/1985 |
| JP | 07063956 | 3/1995 |
| JP | 2000292642 | 10/2000 |
| WO | PCT WO 94/18815 | * 8/1994 |
| WO | 98/01783 | 1/1998 |
| WO | 98/21801 | 5/1998 |

OTHER PUBLICATIONS

International Search Report for PCT/GB 02/01745.  
Great Britain Search Report for GB 0110366.2.  
International Preliminary Examination Report for PCT/GB 02/01745.

* cited by examiner

*Primary Examiner*—Javaid H. Nasri  
(74) *Attorney, Agent, or Firm*—Myers Bigel Sibley & Sajovec

(57) ABSTRACT

An assembly for sealingly enclosing a space into which one or more optical fibres and/or optical cables is or are fed includes a container defining the space and a sealing member. The container has an opening therein. The sealing member sealingly encloses the one or more optical fibres and/or optical cables positionable distinctly and separately from the container. The sealing member: (a) can be placed in the opening so that the one or more optical fibres and/or optical cables extend through the opening into the container, and (b) can be heat and/or pressure sealed to the container to seal the opening around the one or more optical fibres and/or optical cables.

8 Claims, 3 Drawing Sheets

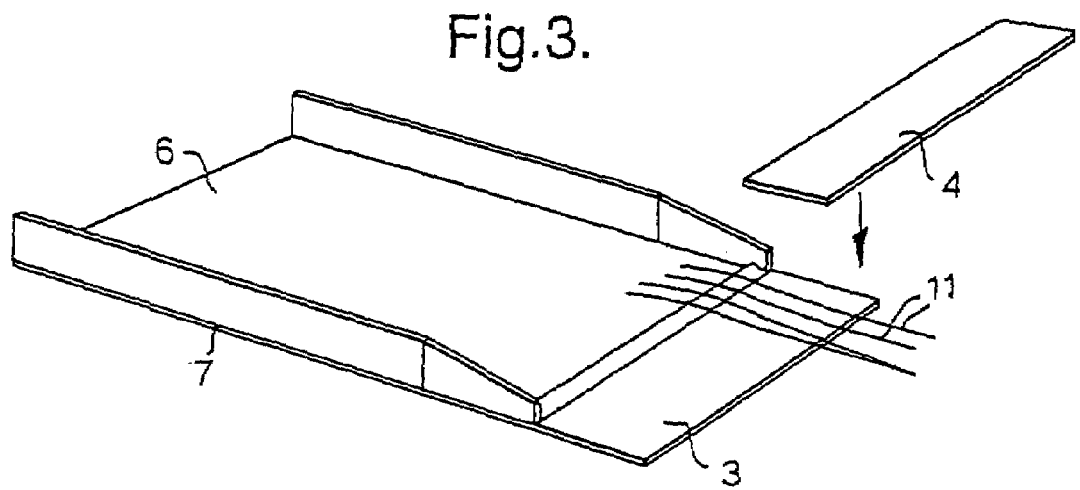
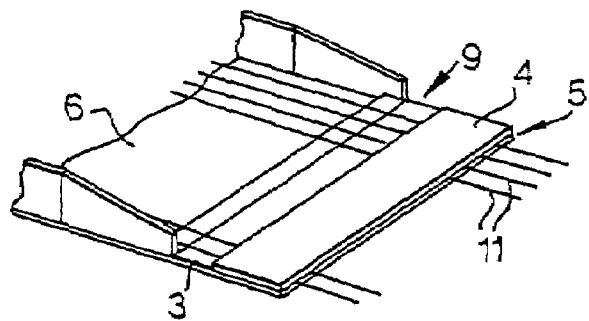
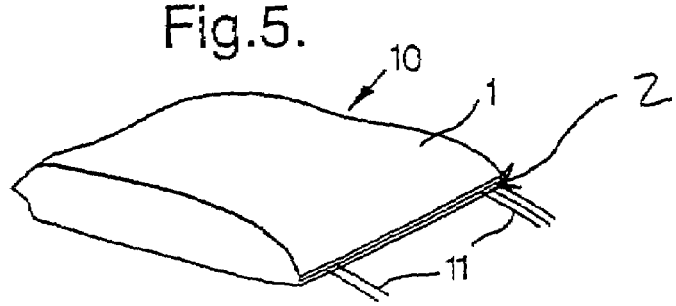

OPTICAL FIBRE SEALING ASSEMBLY

RELATED APPLICATIONS

This application is a continuation application of U.S. patent application Ser. No. 11/227,581 filed on Sep. 15, 2005, now U.S. Pat. No. 7,046,901, which is a continuation application of U.S. patent application Ser. No. 10/475,768, filed Oct. 23, 2003, which issued on Nov. 22, 2005 as U.S. Pat. No. 6,968,113, which is a National Phase application of PCT/GB02/01745 filed on Apr. 15, 2002 and published in English, which claims priority from Application GB 0110366.2 filed on Apr. 27, 2001.

FIELD OF THE INVENTION

The present invention relates to optical fibre sealing. More in particular, the present invention relates to a method of and a device for sealingly enclosing a space into which one or more optical fibres or cables are fed.

BACKGROUND OF THE INVENTION

It is well known that moisture has adverse effects on the properties of optical components. The split ratio of optical splitters, for example, may be influenced by the presence of moisture, and in optical connectors moisture may lead to increased losses. The sealing of optical components against moisture and other environmental influences, in other words environmental sealing, is therefore highly desirable.

It has been proposed to environmentally seal individual optical components. This is, however, expensive and not always effective.

In the case of electrical or electronic components it is known to seal an entire circuit by enclosing it in a flexible, moisture-resistant bag. WO 94/18815 (Ericsson), for example, discloses a casing for flexibly enclosing electronic circuitry. The casing comprises a laminate consisting of metal and plastic sheets. Two sheets of laminate are joined to form an envelope in which electronic circuitry may be accommodated. Electrical conductors pass through the joint region of the laminate.

Although such an arrangement may be effective for sealing electronic circuits, it is less suitable for optical components or circuits. The present inventors have found that optical fibres, unlike electrical conductors such as copper wires, should not be passed through the joint region of the laminate without additional measures. Copper wires (or other electrical conductors) may be bent under almost any angle without affecting their conductive properties. Optical fibres however, while being more flexible than copper wires, should not be bent under the minimum bending radius at which light losses occur (usually approximately 3 cm), and certainly not under the minimum bending radius at which they suffer permanent damage. In addition, optical fibres are made of glass which has different sealing properties to metal.

SUMMARY OF THE INVENTION

It is therefore an object of the present invention to provide a method of sealing elongate objects entering a closure which avoids the problems of the Prior Art and which is particularly suitable for optical fibres.

It is another object of the present invention to provide a method which is relatively simple and economical.

It is a further object of the present invention to provide a method which can be used for different types of closures, both rigid and flexible closures.

It is a yet further object of the present invention to provide a device for enclosing a space into which optical fibres are fed, and a kit-of-parts for forming such a device.

Accordingly, the present invention provides an assembly sealingly enclosing a space into which one or more optical fibres and/or optical cables is or are fed, the assembly comprising a container having an opening, one or more optical fibres and/or cables extending throughout the said opening into the said container, and a sealing member sealingly enclosing the said fibres or cables and sealing the said opening, the sealing member comprising two sealing strips heat-and/or pressure-sealed together around the said fibres and/or cables extending between the said strips and heat-and/or pressure sealed to the container to seal the said opening onto the said strips.

The present invention also provides a method of sealingly enclosing a space into which one or more optical fibres and/or optical cables is or are fed, which method comprises the steps of providing a container having an opening, providing two sealing strips, accommodating a portion of one or more optical fibres and/or cables between the two sealing strips, applying heat and/or pressure to the strips so as to produce a sealing member which sealingly encloses the fibres and/or cables, placing the sealing member in said opening, and applying heat and/or pressure to the container so as to seal said opening onto the strips.

Conceivably, the container could be provided with the sealing strips pre-sealed to opposed surfaces of the opening, ready to receive and seal around the fibres and/or cables.

By sealingly enclosing a portion of the optical fibres and/or cables between two sealing strips the fibres are supported over part of their length, thus preventing excessive bending of the fibres and facilitating their handling. In addition, a good seal can be obtained by applying heat/and or pressure. By subsequently sealing the edges of the container opening onto the strips, an excellent seal can be obtained. Alternatively, the edges of the container opening are sealed onto the strips when the strips are sealed together.

It will be understood that the container may consist of, for example, two sheets of laminate, the edges of which may not be joined until these sheets are sealed onto the sealing strips. Alternatively, a tubular container may be used having openings at both ends, one or both of which may be provided with a pair of sealing strips.

The sealing strips are preferably made of plastic, so that they soften when heat is applied. This allows the optical fibres to be embedded in the pair of strips.

Advantageously, the sealing strips are provided with a layer of hot-melt adhesive. This adhesive may be applied on the sides of the strips facing the other strips, and/or on the sides facing the edges of the container opening.

Preferably, the said portion of the at least one optical fibre extends substantially transversely to the longitudinal direction of the strips. This is particularly advantageous when a plurality of optical fibres is accommodated, which can be arranged in parallel along the length of the strips.

In a preferred embodiment the strips have an effective width of at least 1 cm, preferably at least 2 cm. The width of the strips defines the maximum effective sealing length of the optical fibres and a minimum sealing of a few millimetres is required. It will be understood that the greater the overlapping width of the strips, the greater the effective sealing length of the fibres.

The strips preferably have sufficient rigidity to resist bending of the optical fibres. Although rigid strips may be used, strips having some flexibility are preferred. In the case of plastic strips, a thickness of about 0.2 to 2.0 mm is preferred, although other thicknesses are also possible. The length of the strips may be determined by the size of the container opening.

The present invention further provides a device for sealingly enclosing a space into which at least one optical fibres if fed, the device being produced by the method as defined above. The present invention further provides a kit-of-parts for forming such a device. The device of the present invention comprises a container or container parts, and two sealing strips for accommodating optical fibres between them.

BRIEF DESCRIPTION OF THE DRAWINGS

The present invention will be further discussed below with reference to exemplary embodiments illustrated in the accompanying drawings, in which:

FIG. 3 shows, in perspective, a tray for optical components in accordance with the present invention;

FIG. 4 shows, in perspective, the tray of FIG. 3 with sealed fibres;

FIG. 5 shows, in perspective, the tray of FIGS. 3 and 4 enclosed in a container.

DETAILED DESCRIPTION OF EMBODIMENTS OF THE INVENTION

Figure 1:
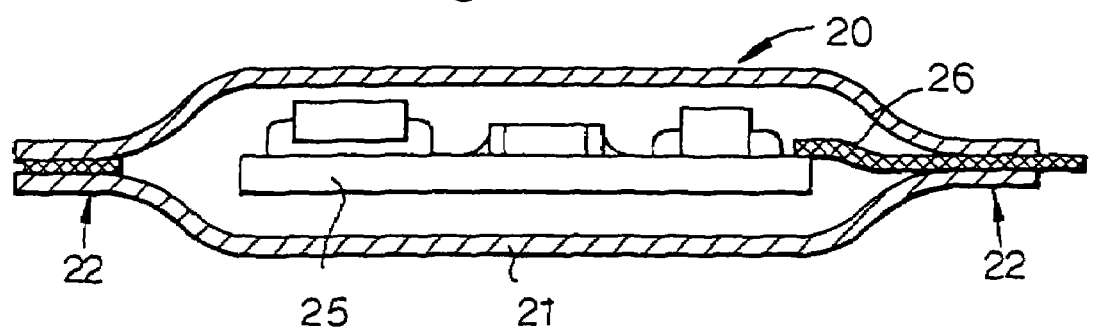
FIG. 1 shows, in cross-sectional view, a device for enclosing electronic circuitry according to the Prior Art.

The Prior Art device 20 shown in FIG. 1 is constituted by a flexible bag which consists of two laminated sheets 21. The sheets are joined in joint regions 22. A printed circuit board (PCB) 25 is contained in the device 20. Electrical conductors 26 pass directly through one of the joint regions 22 without any additional support. This device is disclosed in the aforementioned International Patent Application WO 94/18815.

Figure 2A:
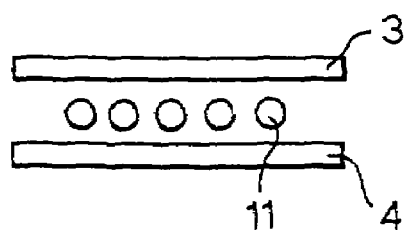
FIGS. 2a and 2b show, in cross-sectional view, how optical fibres are sealed in accordance with the present invention.
Figure 2B:
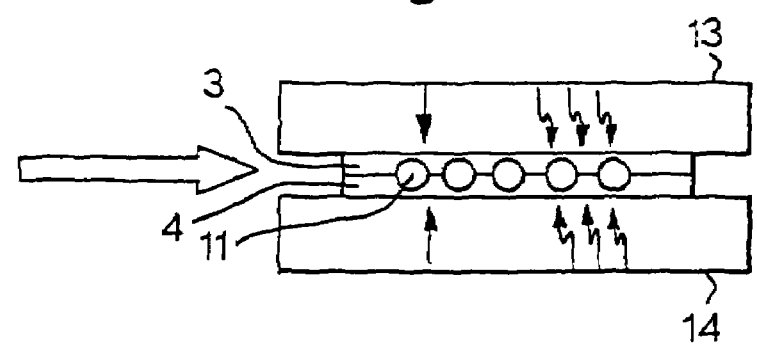

It is schematically shown in FIGS. 2a and 2b how optical fibres are sealed in accordance with the present invention. Fibres 11 are accommodated between sealing strips 3 and 4, as shown in FIG. 2a. In a next step, as shown in FIG. 2b, the sealing strips 3, 4 and the fibres 11 sandwiched between them are accommodated between two plates 13 and 14. Heat and/or pressure, preferably both is applied, causing the sealing strips 3, 4 to change shape and to sealingly surround the fibres 11. When made of plastic, the sealing strips 3, 4 may melt slightly, resulting in a good mutual bond and a good bonding with the optical fibres. An even better bonding with the fibres may be obtained when their cladding is removed prior to being accommodated between the sealing strips.

It will be understood that the fibres 11 and the sealing strips 3, 4 extend in parallel over some distance perpendicular to the plane of the drawing. The portion of the length of the fibres sealingly enclosed by both strips defines the effective sealing length of the fibres.

The tray 6 shown in FIG. 3 is suitable for accommodating optical components and/or optical circuitry. Optical fibres 11 lead into the tray. Underneath the tray 6 a (relatively rigid) sheet 7 is mounted. The sheet 7 extends beyond the tray 6 so as to leave a first strip 3 which supports the optical fibres.

In accordance with the present invention, a second strip 4 is placed upon the first strip 3 so as to enclose the fibres 11 in the manner shown in FIG. 2. As shown in FIG. 4, the second strip 4 may have a smaller width than the first strip 3, leaving a transition region 9 which serves to accommodate any difference in height between the first strip 3 and the plane of the tray 6. In this transition region 9, suitable bend control means (not shown) may be located.

The container 1 shown in FIG. 5 is a flexible bag, preferably made of an aluminum/polyethylene laminate. Laminates of this kind are, for example, used in Raychem's TDUX™ products, as disclosed in EP 0 579 641. The bag has an opening 2, the edges of which are sealed at the strips 3, 4 thus providing an excellent seal. The resulting device 10 sealingly encloses the space defined by the tray 6 and may contain optical components and/or an entire optical circuit.

Figure 6:
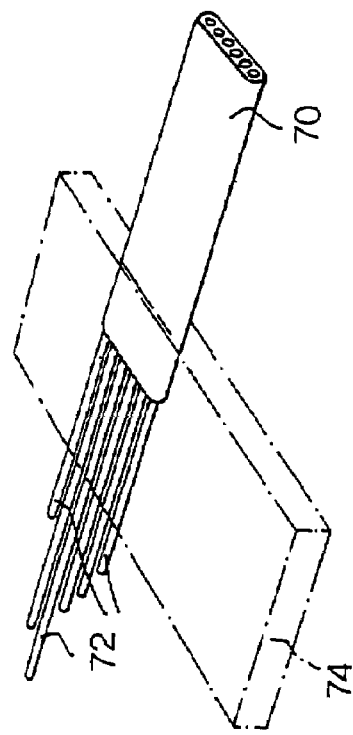
FIG. 6 shows, in perspective, the sealing strips in use on buffered fibres.
Figure 7:
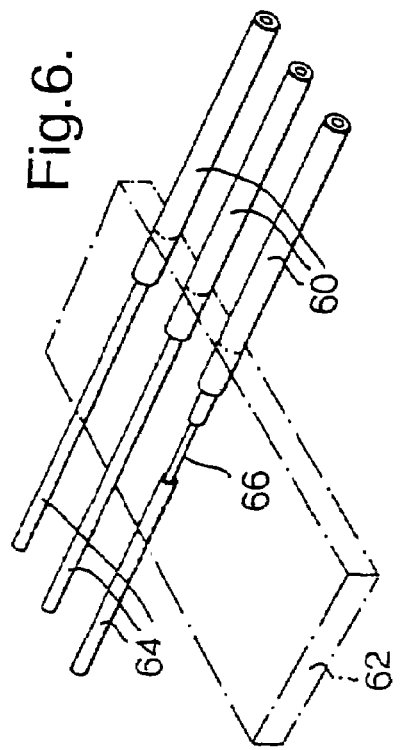
FIG. 7 shows, in perspective, the sealing strips in use on a ribbon cable.
Figure 8:
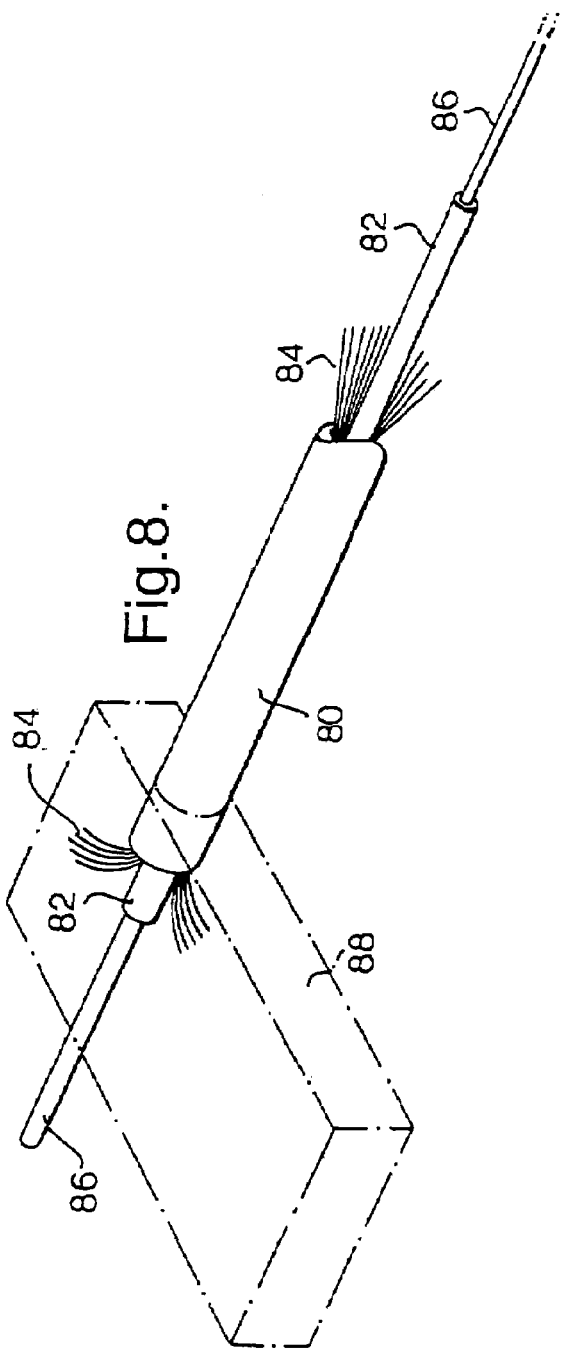
FIG. 8 shows, in perspective, the sealing strips in use on a reinforced cable.

FIGS. 6, 7 and 8 show the way various fibre optic cable constructions may be terminated in a sealing strip according to the invention to achieve both a good moisture barrier level, mechanical protection and strain relief. FIG. 6 shows secondary coated fibre (buffer tube) 60 that is embedded in the polymer strip 62. This buffer tube can be unfilled or filled with grease or silicone sealant for example. To create an improved sealing level the buffer tube 60 is stripped off over a certain distance. The transition point between buffer 60 and primary coated fibre 64 is embedded in the strip to prevent moisture from leaking through the secondary tube 60. The primary coating may optionally be removed to expose the uncoated fibre 66. A second benefit is the mechanical protection of the transition area that is more fragile to mechanical movement. A third benefit of this embedded termination is a strain relief function when a fibre is pulled.

In FIG. 7 the termination of a ribbon fibre assembly 70 is shown. A ribbon is a flat cable assembly of several optical fibres 72. These are primary coated fibres that are over coated to group these fibres. This ribbon coating is often not strongly bonded to the primary coated fibres to allow removal of the coating for better handling of single fibres. Several moisture leak paths can be present between the over coating and the fibres. To achieve a good sealing these leak paths are blocked when the coating is removed over a certain distance and this is embedded in the sealing strip 74. Again mechanical protection of the transition and strain relief of the fibres and ribbon is achieved.

Also reinforced cable constructions like patch cords, indoor cable subunits, for example, can be terminated in a strip according to this invention. In FIG. 8 a patch cord termination is shown. To achieve a good sealing, the cable assembly 80 is stripped down to expose the buffer 82, strength members 84, and the primary coated fibre 86 and the resulting transition zone is embedded. To generate a higher strain relief level the strength members 84 can be embedded in the strip 88 for fixation. When the cable is pulled the stresses will be passed to the strength members without affecting the fibres. To get an even higher sealing level the primary coating can be removed from a fibre over a certain distance before embedding as shown for one of the fibres in FIG. 6. This is optional but not essential to achieve a good sealing level.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An assembly for sealingly enclosing a space into which one or more optical fibres and/or optical cables is or are fed, the assembly comprising:
   a container defining the space, the container having an opening therein; and
   a sealing member sealingly enclosing the one or more optical fibres and/or optical cables and being positionable distinctly and separately from the container, wherein the sealing member (a) can be placed in the opening so that the one or more optical fibres and/or optical cables extend through the opening into the container, and (b) can be heat and/or pressure sealed to the container to seal the opening around the one or more optical fibres and/or optical cables;
   wherein the sealing member comprises sealing strips and wherein the one or more optical fibres and/or cables extend substantially transversely to a longitudinal direction of the sealing strips.

2. The assembly of claim 1, wherein the container is substantially rigid.

3. The assembly of claim 1, wherein the container is substantially flexible.

4. The assembly of claim 3, wherein the container comprises a laminate bag including aluminum.

5. The assembly of claim 1, wherein the sealing strips comprise plastic sealing strips.

6. The assembly of claim 1, wherein the sealing strips include a layer of hot-melt adhesive.

7. The assembly of claim 1, wherein a plurality of optical fibres and/or cables are accommodated between the sealing strips.

8. The assembly of claim 1, wherein the sealing strips have an effective width of at least 1 centimeter (cm).

* * * * *